US010240386B2

(12) United States Patent
Wise

(10) Patent No.: US 10,240,386 B2
(45) Date of Patent: Mar. 26, 2019

(54) AUTOMATIC VEHICLE DOOR OPENING AND CLOSING SYSTEM

(71) Applicant: Margaret Wise, Bronx, NY (US)

(72) Inventor: Margaret Wise, Bronx, NY (US)

(*) Notice: Subject to any disclaimer, the term of this patent is extended or adjusted under 35 U.S.C. 154(b) by 90 days.

(21) Appl. No.: 15/669,957

(22) Filed: Aug. 6, 2017

(65) Prior Publication Data
US 2019/0040672 A1 Feb. 7, 2019

(51) Int. Cl.
E05F 11/00 (2006.01)
E05F 15/75 (2015.01)
E05F 15/619 (2015.01)
E05F 15/73 (2015.01)
E05F 15/53 (2015.01)
E05F 15/79 (2015.01)
E05B 81/76 (2014.01)
E05F 15/41 (2015.01)
B60J 5/04 (2006.01)

(52) U.S. Cl.
CPC .............. E05F 15/75 (2015.01); B60J 5/047 (2013.01); E05B 81/76 (2013.01); E05F 15/41 (2015.01); E05F 15/53 (2015.01); E05F 15/619 (2015.01); E05F 15/73 (2015.01); E05F 15/79 (2015.01); E05Y 2900/531 (2013.01)

(58) Field of Classification Search
CPC ......... E05F 15/75; E05F 15/73; E05F 15/619; E05B 81/76; B60J 5/047; E05Y 2900/531
USPC ......... 49/339, 340, 341, 342, 344, 333, 334, 49/336
See application file for complete search history.

(56) References Cited

U.S. PATENT DOCUMENTS

| 3,398,484 | A | * | 8/1968 | Katsumura | ........... E05F 15/622 318/268 |
| 4,121,382 | A | * | 10/1978 | Dietrich | ................ E05F 15/614 49/280 |
| 4,644,693 | A | * | 2/1987 | Wang | .................... E05F 15/619 49/280 |
| 6,382,706 | B2 | * | 5/2002 | Yuge | ........................ B60J 5/106 296/106 |
| 6,711,855 | B1 | * | 3/2004 | Daniels | ................. E05F 15/619 49/139 |
| 6,928,695 | B2 | * | 8/2005 | Ochiai | ................ E05D 11/1042 16/334 |
| 9,080,363 | B2 | * | 7/2015 | Reed | ........................ E05F 5/025 |
| 9,650,824 | B2 | * | 5/2017 | Sauerwein | ................ E05F 5/00 |
| 9,650,826 | B2 | * | 5/2017 | Potter | .................... E05F 15/614 |
| 9,879,465 | B2 | * | 1/2018 | Elie | ........................ E05F 15/611 |
| 9,890,576 | B2 | * | 2/2018 | Elie | ........................ E05F 15/70 |
| 10,008,069 | B2 | * | 6/2018 | Elie | .................... G07F 17/0057 |
| 10,030,431 | B2 | * | 7/2018 | Elie | ........................ E05F 15/77 |
| 2005/0085972 | A1 | * | 4/2005 | Martinez | ................. E05C 17/00 701/49 |

(Continued)

Primary Examiner — Jerry E Redman
(74) Attorney, Agent, or Firm — RG Patent Consulting, LLC; Rachel Gilboy

(57) ABSTRACT

An automatic vehicle door opening and closing system is a system for a vehicle having a controller with at least one button for each door having the system installed, that allows the driver of the vehicle to open or close a preferred door on the vehicle without leaving the driver's seat. A lockout circuit prevents the doors from opening with the automatic function while the vehicle is in motion though the doors may be opened manually if not locked using the vehicle's own door lock system.

17 Claims, 6 Drawing Sheets

(56) References Cited

U.S. PATENT DOCUMENTS

| | | | |
|---|---|---|---|
| 2005/0242618 A1* | 11/2005 | Menard | E05F 15/43 296/146.4 |
| 2007/0175099 A1* | 8/2007 | Kachouh | E05F 15/611 49/340 |
| 2008/0163709 A1* | 7/2008 | Choi | F16M 11/08 74/89.14 |
| 2008/0229666 A1* | 9/2008 | Jones | E05F 15/635 49/334 |
| 2008/0295408 A1* | 12/2008 | Heissler | E05F 15/619 49/324 |
| 2008/0296927 A1* | 12/2008 | Gisler | E05F 15/43 296/146.4 |
| 2008/0309118 A1* | 12/2008 | Kohlstrand | E05D 11/1007 296/146.1 |
| 2009/0051192 A1* | 2/2009 | Ewing | E05F 15/622 296/146.2 |
| 2009/0120002 A1* | 5/2009 | Domholt | E05F 15/619 49/340 |
| 2015/0059250 A1* | 3/2015 | Miu | E05F 15/611 49/349 |
| 2015/0283886 A1* | 10/2015 | Nania | E05F 15/73 296/146.4 |
| 2017/0030126 A1* | 2/2017 | Elie | E05F 15/614 |
| 2018/0202212 A1* | 7/2018 | Xiao | E05F 5/025 |
| 2018/0238098 A1* | 8/2018 | Rhode | E05F 15/73 |

* cited by examiner

AUTOMATIC VEHICLE DOOR OPENING AND CLOSING SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of automatic door closers and more specifically relates to an automatic vehicle door opening and closing system.

2. DESCRIPTION OF THE RELATED ART

Every day, millions of people use their vehicles to travel across the nation's highways. Automobiles offer consumers a simple way in which to get from one place to another, both safely and easily. Vehicles for human travel have been in existence since around 1896, and many changes and great innovations in vehicle travel have been taken place since then. Estimates indicate there are over 250 million private vehicles on the road. Automobiles are produced in an almost endless variety of makes and models, from rugged SUV's and light trucks, to luxury sedans and minivans, there is a make and model of vehicle to satisfy the needs of virtually any consumer.

When designing automobiles, safety is a primary concern for automotive engineers. As such, vehicles are designed to withstand impact in the event of fender benders and minor collisions, with the body of the vehicle still maintaining its structural integrity after such events. Obviously, high impact collisions can cause greater damage to the vehicle and can be quite hazardous to motorists, but most would agree that vehicle cabins are designed with both safety and comfort in mind. As with the vehicle cabin, motor vehicle driver and passenger doors are designed to withstand impact and provide a secure, enclosed environment for those traveling in the vehicle As such, vehicle doors can be quite heavy and many find that closing the doors upon entering their vehicle can be difficult. This is especially true when a person has a lack of mobility, an injury, or is aged and feeble.

For those who drive large sedans and SUVs, the vehicle doors are not only heavy, but also very large. Because of this, motorists often have to lean completely outside the vehicle, simply in order to access the door's handle and pull the door closed. When opening and closing doors on roadways, the task can be dangerous because leaning out of a vehicle in order to close a heavy door can result in the motorist or their passenger losing their balance, and in worse case scenarios, falling out of the vehicle and sustaining an injury. Further, when a vehicle is parked on a street and the door is open prior to the motorist pulling it closed, there is a real risk that the door can be struck by oncoming traffic: an extremely dangerous scenario. While any motorist might find it challenging to close a heavy car door while sitting in the car, seniors and those who suffer with limited mobility can find the task of doing so especially difficult.

Various attempts have been made to solve the above-mentioned problems such as those found in U.S. Pat. No. 8,171,673 to James M. Helms; U.S. Pat. No. 8,326,497 to Bijan K. Shahidi; and U.S. Pat. No. 3,160,408 to John W Woods. This prior art is representative of mechanisms for remotely controlling the opening and closing of vehicle doors. None of the above inventions and patents, taken either singly or in combination, is seen to describe the invention as claimed.

Ideally, an automatic door closer should provide safety and convenience in opening and closing car doors without leaving the driver seat, and yet, would operate reliably and be manufactured at a modest expense. Thus, a need exists for a reliable automatic vehicle door opening and closing system to avoid the above-mentioned problems.

BRIEF SUMMARY OF THE INVENTION

In view of the foregoing disadvantages inherent in the known automatic door closer art, the present invention provides a novel automatic vehicle door opening and closing system. The general purpose of the present invention, which will be described subsequently in greater detail, is to provide safety and convenience in opening and closing car doors without leaving the driver seat.

The automatic vehicle door opening and closing system preferably comprises at least one closing arm having a door attachment end adapted to be pivotally attached to the hinge side of the vehicle door, and a vehicle attachment end adapted to be pivotally attached to the door hinge jamb of a vehicle. The closing arm is adapted to pivotally swing the vehicle door to a user preferred position upon an existing vehicle door hinge axis.

At least one electric motor is in operative communication with the closing arm and is adapted to actuate the closing arm to pivotally swing the vehicle door to the user preferred position. At least one obstruction sensor switch is adapted to be connected to the vehicle door jamb to detect an object such as a person's leg or arm that is located within a plane of the vehicle door closed area while the vehicle door is in the door open position, and to stop and reverse the closing motion of the vehicle door to thereby move the vehicle door to the door open position.

A door controller is adapted to be connected to the vehicle dash board that includes a plurality of pushbuttons each in communication with the door controller and adapted to allow the user to manually control the pivotal swinging motion of the vehicle door via pressing of one of the plurality of pushbuttons that are adapted to be in communication with the door controller.

The power source for the automatic vehicle door opening and closing system to operate the electric motor(s) and the obstruction sensor switch(es), is the power source or battery of the vehicle for starting the vehicle and for operating the accessories of the vehicle. The automatic vehicle door opening and closing system is useful for increasing safety and convenience of the user by enabling the user to choose between either closing the vehicle door or opening the vehicle door without having to leave a driver seat of the vehicle.

The system may be a hydraulically operated system and may further have a hydraulic pump connected to and operated by the electric motor(s). The closing arm(s) may be formed as a hydraulic cylinder, in hydraulic embodiments, and adapted to be in communication with the hydraulic pump such that the closing arm is adapted to be extendable and contractible in length via the hydraulic pump.

The closing arm may be operated by the electric motor, in electric embodiments, where the closing arm is formed as a toothed rack movable by a pinion gear that is operated by the electric motor via the door controller. The closing arm is preferably covered with a flexible boot that is designed to expand and contract as the vehicle door is opened and closed to prevent contact with the toothed rack which is able to be seen and contacted between the vehicle door and the vehicle door jamb. The electric motor is located between the inner and the outer shell of the body member behind the vehicle door jamb and so is not seen or able to be contacted unintentionally, but may be accessed through an access opening from within the cab near the floor forward of the vehicle door jamb.

The door controller may have a manual override operation by pressing one of the pushbuttons on the door controller. Each respective one of the pushbuttons is adapted to correspond to a different door that has an automatic vehicle door opening and closing system installed. An automatic operation may include duration programmable time delay closure function that operates from a time clock based function that may be in the form of a program within the controller. The closing arm may include a spring member for assisting the door closing function. The spring member may be either a compression spring or a tension spring depending on which embodiment it is used in, for instance the rack and pinion embodiment may utilize a tension spring while the hydraulic embodiment may utilize a compression spring.

The obstruction sensor switch may be formed as a pressure detecting switch adapted to detect resistance when closing the vehicle door and to reverse the closing motion of the door to the open position to prevent injury, but the obstruction sensor switch may also be formed as a motion detector adapted to detect motion within the vehicle door closed plane when the door is closing, and reverse the motion of the door to an open position. Both types of sensors may also be employed.

The door handle preferably has a door handle activation switch adapted to be activated by the door latch and signal the door controller to thereby cause the vehicle door to open via closing arm when the door latch is released. The electric motor is a direct current powered motor. Safety features may preferably includes a vehicle in motion lockout circuit that is in communication with the central processing unit of the vehicle and is adapted to prevent the vehicle doors from automatically opening while the vehicle is in motion. The doors may still be opened manually provided that the vehicle's own door-lock system is not engaged.

The combination of a vehicle and an automatic vehicle door opening and closing system preferably comprises a vehicle having a body member with a chassis that includes at least one axle member adapted to support the body member and the chassis and is adapted to couple to a plurality of wheels. The vehicle has a steering wheel that is connected to the chassis and adapted to allow the user to control the direction of travel of the vehicle. The body member has at least one vehicle door that is adapted to hingedly couple to the body member and to enclose the body member against the weather elements.

At least one vehicle door will have a closing arm having a door attachment end adapted to be pivotally attached to the hinge side of a vehicle door, and a vehicle attachment end adapted to be pivotally attached to a door hinge jamb of a vehicle. The closing arm is adapted to pivotally swing the vehicle door to a user preferred position upon the existing vehicle door hinge axis. The system may have at least one electric motor for each door equipped with the automatic vehicle door opening and closing system that is in operative communication with the closing arm and is adapted to actuate the closing arm to pivotally swing the vehicle door to a user preferred position.

At least one obstruction sensor switch may be used as a safety feature that is adapted to be connected to the vehicle door jamb to detect an object located within the plane of the vehicle door closed area while the vehicle door is in the door open position, or during a closing motion, and to stop the closing motion of the vehicle door and reverse it to the open position until the obstruction is cleared. A door controller may be mounted to the vehicle dash board and preferably includes a plurality of pushbuttons with each one in communication with the door controller and adapted to allow the user to manually control the pivotal swinging motion of a chosen vehicle door via pressing the corresponding pushbutton that is in communication with the door controller. The power source for the automatic vehicle door opening and closing system is the vehicle power source for starting the vehicle engine and operating the vehicle accessories. The power source is adapted to provide power to the electric motor(s) and the obstruction sensor switch(es). The automatic vehicle door opening and closing system is useful for increasing the safety and convenience of the user by enabling the user to choose between opening and closing a user preferred door of the vehicle without the user having to leave the driver seat of the vehicle.

The present invention holds significant improvements and serves as an automatic vehicle door opening and closing system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, automatic vehicle door opening and closing system, constructed and operative according to the teachings of the present invention.

DETAILED DESCRIPTION

As discussed above, embodiments of the present invention relate to an automatic door closer and more particularly to an automatic vehicle door opening and closing system as used to improve the safety and convenience in opening and closing car doors without leaving the driver seat.

Generally speaking, a automatic vehicle door opening and closing system is a system for a vehicle having a controller with at least one button for each door having the system installed, that allows the driver of the vehicle to open or close a preferred door on the vehicle without leaving the driver's seat. A lockout circuit prevents the doors from opening with the automatic function while the vehicle is in motion though the doors may be opened manually if not locked using the vehicle's own door lock system.

Figure 1:
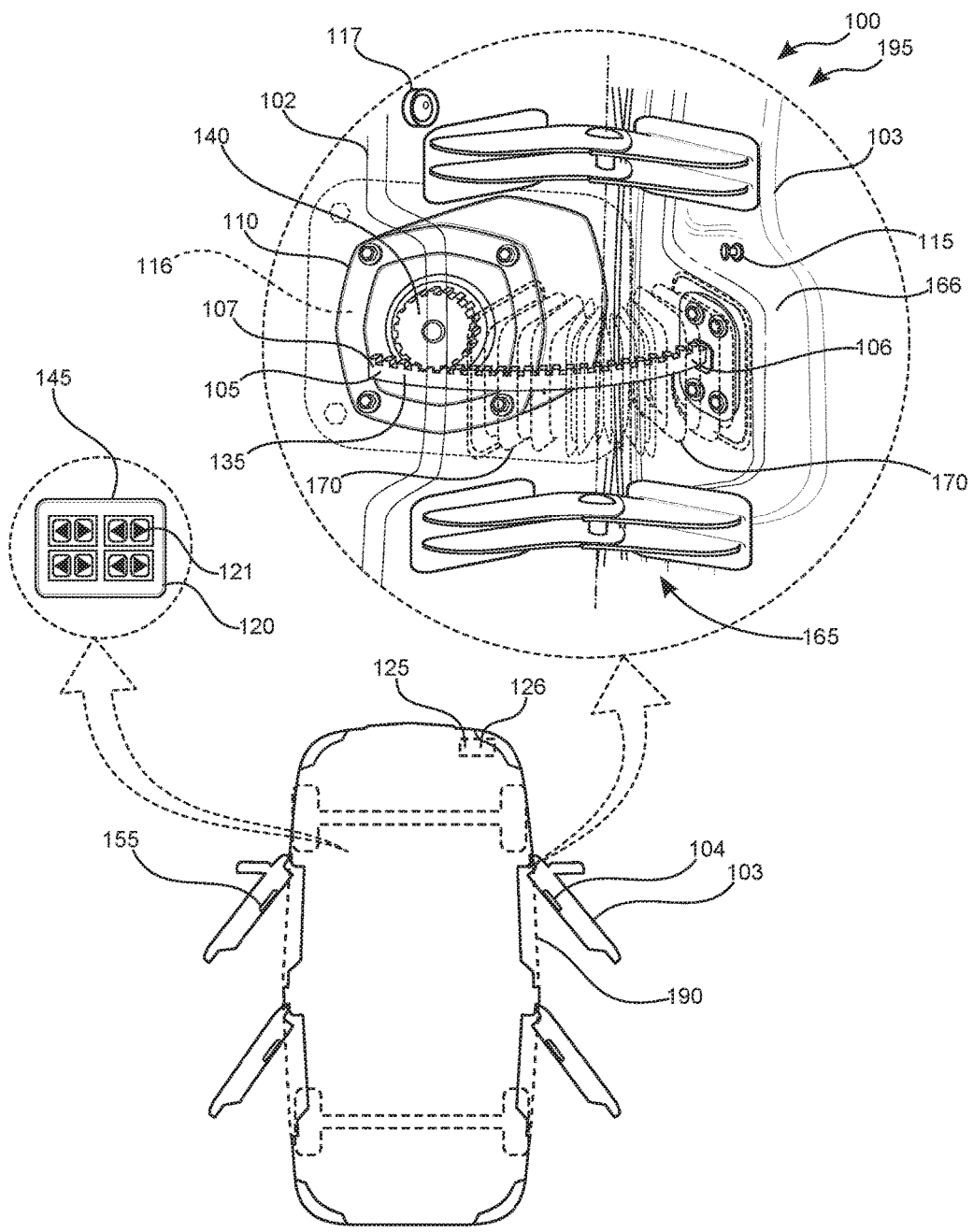
FIG. 1 shows a perspective view illustrating a first embodiment of an automatic vehicle door opening and closing system according to an embodiment of the present invention.

In greater detail now, referring to the drawings by numerals of reference there is shown in FIG. 1, a perspective view illustrating a first embodiment of automatic vehicle door opening and closing system 100 according to an embodiment of the present invention.

Automatic vehicle door opening and closing system 100 enables a user to be able to remain seated in the driver seat of vehicle 102 and to either open or to close any vehicle door 214 on vehicle 102 with the use of closing arm 105, which is actually an opening and closing arm 105 attached between vehicle door jamb 165 of vehicle 102 and hinge side 166 of vehicle door 103, controlled by door controller 120 located within arm's reach of vehicle 102 driver seat. Automatic vehicle door opening and closing system 100 preferably comprises at least one closing arm 105 having door attachment end 106 adapted to be pivotally attached to hinge side 166 of vehicle door 103, and vehicle attachment end 107 adapted to be pivotally attached to vehicle door jamb 165 of vehicle 102. Closing arm 105 is adapted to pivotally swing vehicle door 103 to a user preferred position upon an existing vehicle door hinge axis.

Door controller 120 is adapted to be connected to vehicle 102 dash board that includes a plurality of pushbuttons 121, each in communication with door controller 120 and adapted to allow the user to manually control the pivotal swinging motion of vehicle door 103 via pressing of one of the plurality of pushbuttons 121 that are adapted to be in communication with door controller 120. Door handle 104 preferably has door handle activation switch 155 adapted to be activated by door handle 104 and signal door controller 120 to thereby cause vehicle door 103 to open via closing arm 105 when door handle 104 is released.

Figure 2:
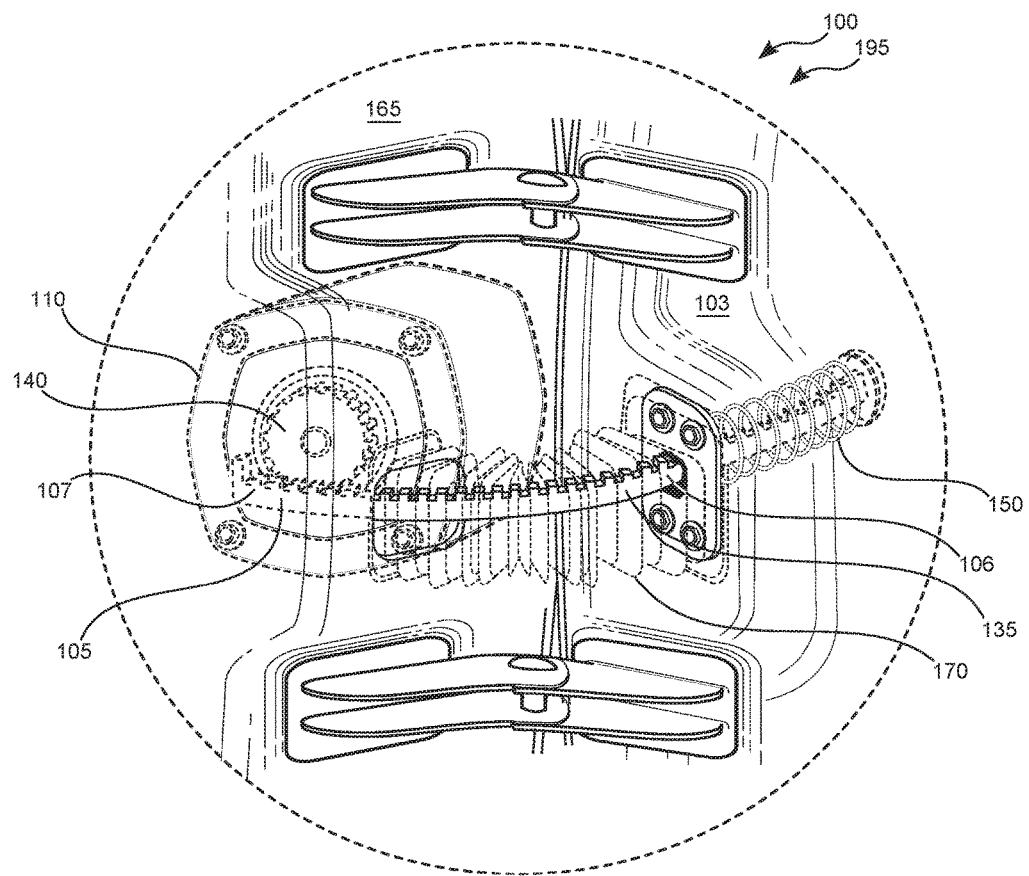
FIG. 2 is a perspective view illustrating the first embodiment of the automatic vehicle door opening and closing system according to an embodiment of the present invention of FIG. 1.

Referring now to FIG. 2, is a perspective view illustrating the first embodiment of automatic vehicle door opening and closing system 100 according to an embodiment of the present invention of FIG. 1.

At least one electric motor 110 is in operative communication with closing arm 105 and is adapted to actuate closing arm 105 to pivotally swing vehicle door 103 to the user preferred position, most generally, to the open or the closed position. Closing arm 105 may be operated by electric motor 110, in electric embodiments, where closing arm 105 is formed as toothed rack 135 movable by pinion gear 140 that is operated by electric motor 110 via door controller 120. Door controller 120 is a direct current powered electric motor 110. Closing arm 105 is preferably covered with flexible boot 170 that is designed to expand and contract as vehicle door(s) 103 is opened and closed to prevent contact with toothed rack 135 which is able to be seen and contacted between vehicle door(s) 103 and vehicle door jamb 165 by pulling flexible boot 170 back. Closing arm 105 may have a slight arcuate shape to prevent binding during the opening motion trajectory of the hinged vehicle door 103. The ends of closing arm may instead be attached at door attachment end and at vehicle attachment end with a hinged pivotal joint to facilitate the motion. Electric motor 110 is located between the inner and the outer shell of the vehicle body behind vehicle door jamb 165 and so is not seen or able to be contacted unintentionally, but may be accessed through an access opening from within the cab near the floor forward of vehicle door jamb 165.

Power source 125 for automatic vehicle door opening and closing system 100 to operate electric motor(s) 110 and obstruction sensor switch(es) 115, is power source 125 or battery 126 of vehicle 102 for starting vehicle 102 and for operating the accessories of vehicle 102. Automatic vehicle door opening and closing system 100 is useful for increasing safety and convenience of the user by enabling the user to choose between either closing vehicle door 103 or opening vehicle door 103 without having to leave the driver seat of vehicle 102.

Figure 3:
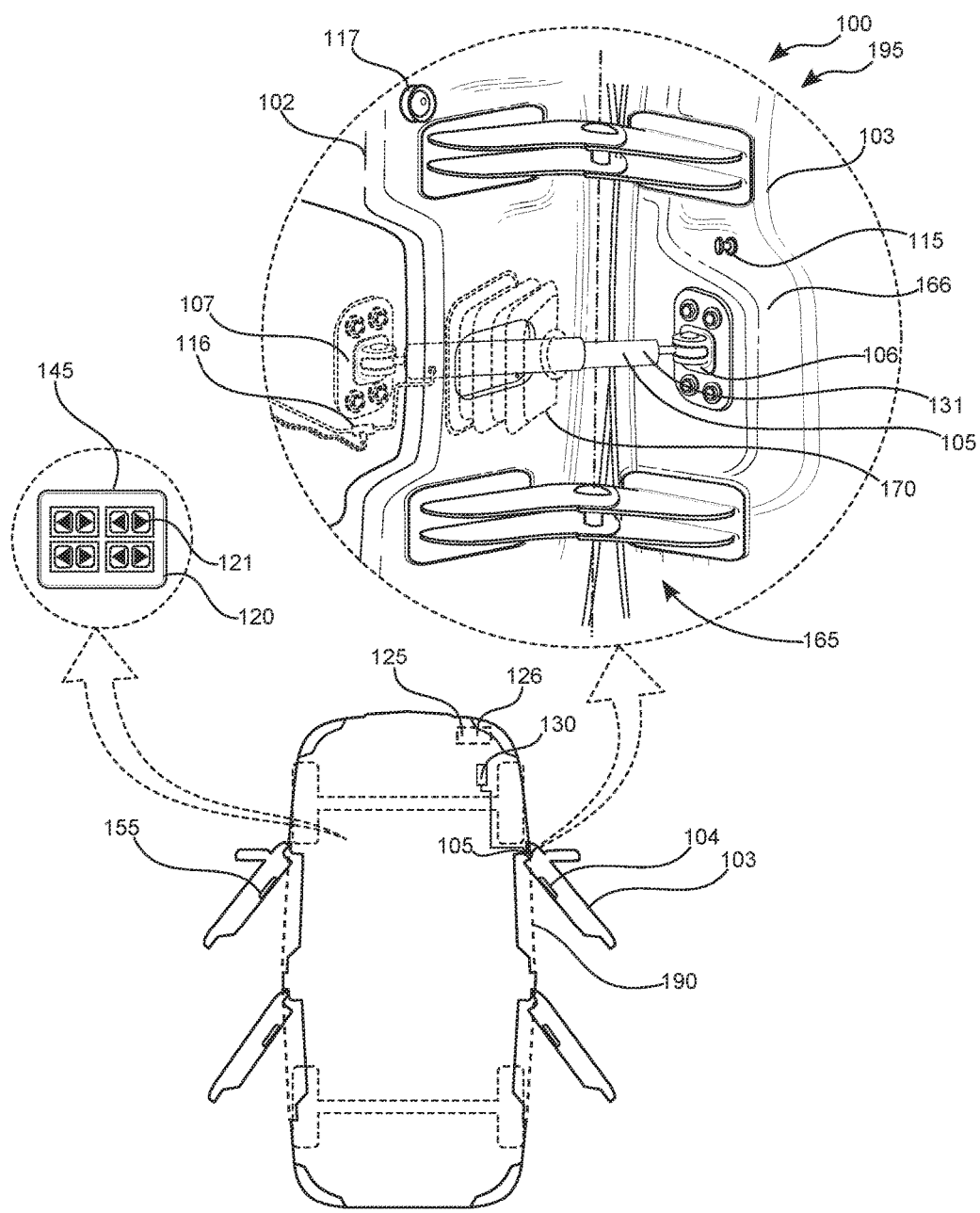
FIG. 3 is a perspective view illustrating a second embodiment of the automatic vehicle door opening and closing system according to an embodiment of the present invention of FIG. 1.

Referring now to FIG. 3, is a perspective view illustrating a second embodiment of automatic vehicle door opening and closing system 100 according to an embodiment of the present invention of FIG. 1.

System 100 may be a hydraulically operated system 100 and may further have hydraulic pump 130 connected to and operated by electric motor(s) 110. Closing arm 105 may be formed as hydraulic cylinder 131, in hydraulic embodiments, and adapted to be in communication with hydraulic pump 130 such that closing arm 105 is adapted to be extendable and contractible in length via hydraulic pump 130.

Figure 4A:
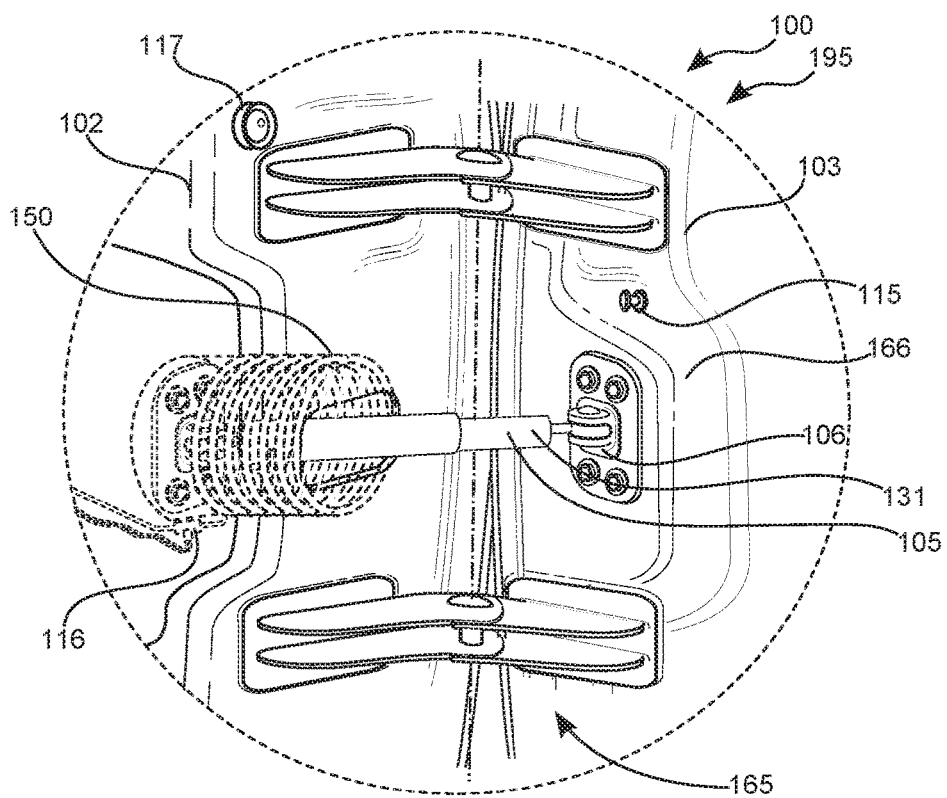
FIG. 4A is a perspective view illustrating the second embodiment automatic vehicle door opening and closing system according to an embodiment of the present invention of FIG. 1.

Referring now to FIG. 4A, is a perspective view illustrating the second embodiment automatic vehicle door opening and closing system 100 according to an embodiment of the present invention of FIG. 1.

Door controller 120 may have a manual override operation by pressing one of pushbuttons 121 on door controller 120. Each respective one of pushbuttons 121 is adapted to correspond to a different vehicle door 103 that has automatic vehicle door opening and closing system 100. An automatic operation may include a duration programmable time delay 145 closure function that operates from a time clock based function that may be in the form of a program within door controller 120. Closing arm 105 may include spring member 150 for assisting vehicle door 103 closing function. Spring member 150 may be either a compression spring member 150 or a tension spring member 150 depending on which embodiment it is used in, for instance toothed rack 135 and pinion gear 140 embodiment may utilize a tension spring member 150 while hydraulic pump 130 embodiment may utilize a compression spring member 150.

Figure 4B:
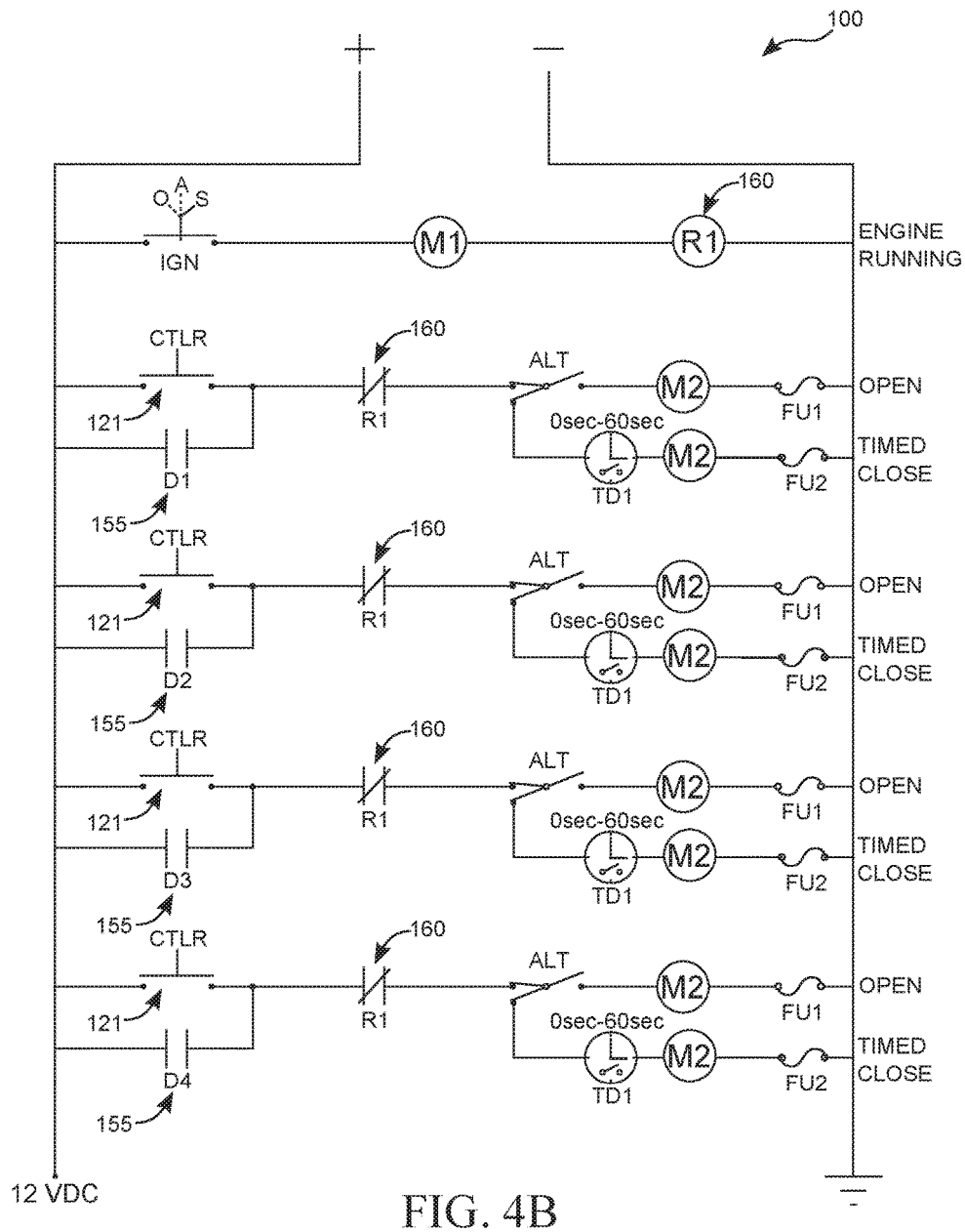
FIG. 4B is a diagram illustrating a vehicle in motion lockout circuit of the automatic vehicle door opening and closing system according to an embodiment of the present invention of FIG. 1.

Referring now to FIG. 4B is a diagram illustrating vehicle in motion lockout circuit 160 of automatic vehicle door opening and closing system 100 according to an embodiment of the present invention of FIG. 1.

Safety features preferably include vehicle in motion lockout circuit 160 that is in communication with the central processing unit of vehicle 102 and is adapted to prevent vehicle door(s) 103 from automatically opening while vehicle 102 is in motion. Vehicle door(s) 103 may still be opened manually provided that vehicle 102 existing doorlock system is not engaged. At least one obstruction sensor switch 115 is adapted to be connected to vehicle door jamb 165 to detect an object such as a person's leg or arm that is located within the plane of vehicle door closed area 190 while vehicle door(s) 103 is in the door open position, and to stop and reverse the closing motion of vehicle door(s) 103 to thereby move vehicle door(s) 103 to the door open position. Obstruction sensor switch 115 may be formed as pressure detecting switch 116 adapted to detect resistance when closing vehicle door(s) 103 and to reverse the closing motion of vehicle door(s) 103 to the open position to prevent injury, but obstruction sensor switch 115 may also be formed as motion detector 117 adapted to detect motion within vehicle door closed area 190 when vehicle door(s) 103 is/are closing, and reverse the motion of vehicle door(s) 103 to an open position. Both types of sensors 115 may also be employed.

Figure 5:
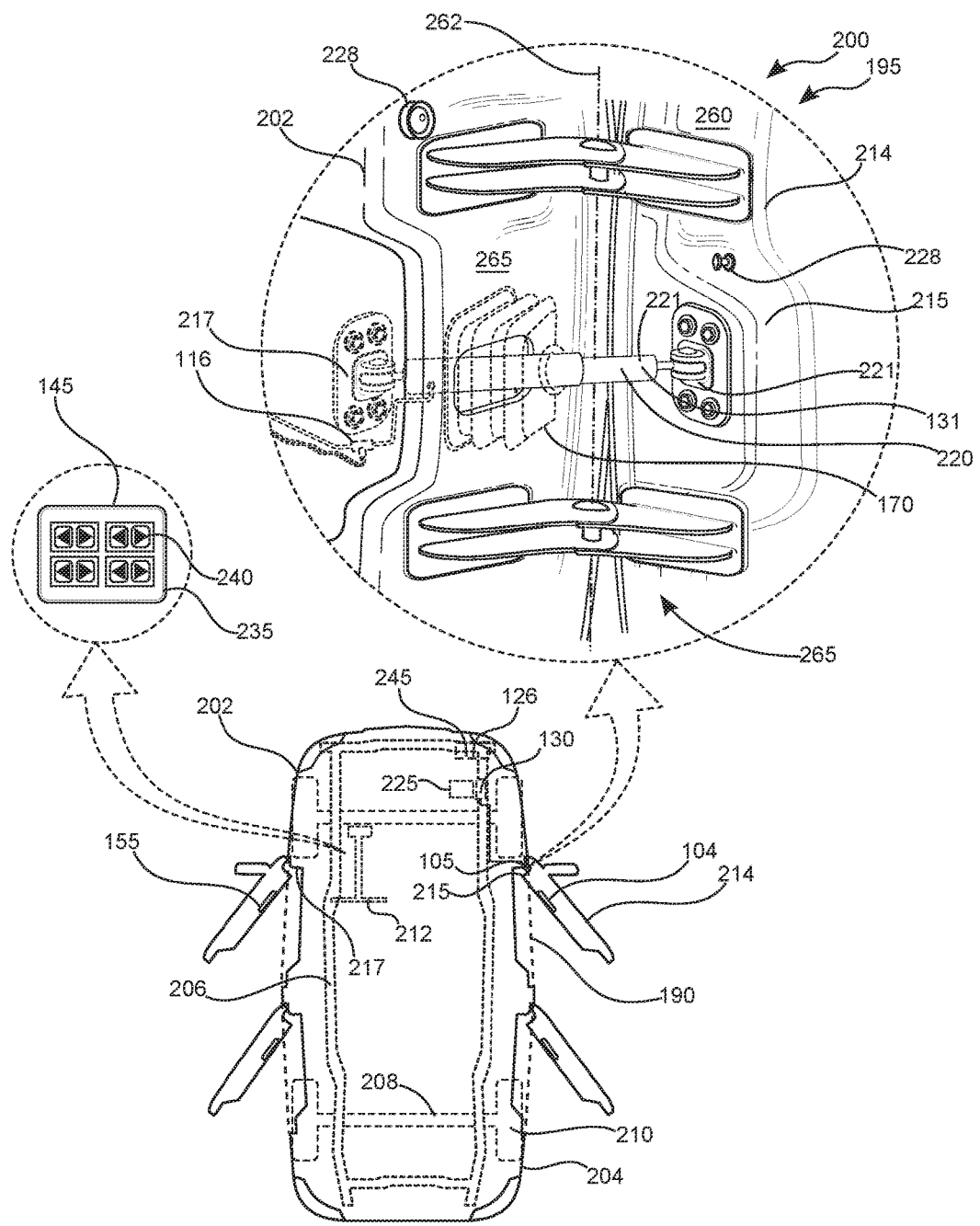
FIG. 5 is a perspective view illustrating the combination of a vehicle and an automatic vehicle door opening and closing system according to an embodiment of the present invention The various embodiments of the present invention will hereinafter be described in conjunction with the appended drawings, wherein like designations denote like elements.

FIG. 5 is a perspective view illustrating the combination of combination of a vehicle and an automatic vehicle door opening and closing system 200 according to an embodiment of the present invention of.

Combination of a vehicle and an automatic vehicle door opening and closing system 200 preferably comprises vehicle 202 having body member 204 with chassis 206 that includes at least one axle member 208 adapted to support body member 204 and chassis 206 and is adapted to couple to a plurality of wheel(s) 210. Vehicle 202 has steering wheel 212 that is connected to chassis 206 and adapted to allow the user to control the direction of travel of vehicle 202. Body member 204 has at least one vehicle door 214 that is adapted to hingedly couple to body member 204 and to enclose body member 204 against the weather elements.

At least one vehicle door 214 will have closing arm 220 having door attachment end 221 adapted to be pivotally attached to hinge side 260 of vehicle door 214, and vehicle attachment end 217 adapted to be pivotally attached to vehicle door jamb 265 of vehicle 202. Closing arm 220 is adapted to pivotally swing vehicle door 214 to a user preferred position upon the existing vehicle door hinge axis 262. System 200 may have at least one electric motor 225 for each vehicle door 214 equipped with automatic vehicle door opening and closing system 100 that is in operative communication with closing arm 220 and is adapted to actuate closing arm 220 to pivotally swing vehicle door 214 to a user preferred position.

At least one obstruction sensor switch 228 may be used as a safety feature that is adapted to be connected to vehicle door jamb 265 to detect an object located within the plane of the vehicle door closed area while vehicle door 214 is in the door open position, or during a closing motion, and to stop the closing motion of vehicle door 214 and reverse it to the open position until the obstruction is cleared. Door controller 235 may be mounted to the vehicle dash board and preferably include a plurality of pushbuttons 240 with each one in communication with door controller 235 and adapted to allow the user to manually control the pivotal swinging motion of a chosen vehicle door 214 via pressing the corresponding pushbutton that is in communication with door controller 235. Power source 245 for combination of a vehicle and an automatic vehicle door opening and closing system 200 is vehicle 202 power source 245 for starting vehicle 202 engine and operating vehicle 202 accessories. Power source 245 is adapted to provide power to electric motor(s) 225 and obstruction sensor switch(s) 228. Combination of a vehicle and an automatic vehicle door opening and closing system 200 is useful for increasing the safety and convenience of the user by enabling the user to choose between opening and closing a user preferred vehicle door 214 of vehicle 202 without the user having to leave the driver seat of vehicle 202.

Automatic vehicle door opening and closing system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., kit contents or arrangements such as, for example, including more or less components, customized parts, different color combinations, parts may be sold separately, etc., may be sufficient.

Upon reading this specification, it should also be appreciated that, under appropriate circumstances, considering such issues as design preference, user preferences, marketing preferences, cost, structural requirements, available materials, technological advances, etc., other methods of use arrangements such as, for example, having pushbuttons located on each vehicle door, the addition or substitution of various safety features, including or excluding certain sensor switches, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An automatic vehicle door opening and closing system comprising:
   at least one closing arm comprising;
      a door attachment end;
         wherein said door attachment end is pivotally attached to a hinge side of a vehicle door; and
      a vehicle attachment end;
         wherein said vehicle attachment end is pivotally attached to a vehicle door jamb of a vehicle; and wherein said at least one closing arm pivotally swings said vehicle door to a user preferred position upon an existing vehicle door hinge axis;

at least one electric motor;

wherein said at least one electric motor is in operative communication with said at least one closing arm and actuates said closing arm to pivotally swing said vehicle door to said user preferred position;

at least one obstruction sensor switch;

wherein said at least one obstruction sensor switch is connected to a vehicle door jamb to detect an object located within a plane of said vehicle door closed area while said vehicle door is in a door open position and to stop a closing motion of said vehicle door and reverse said closing motion to thereby move said vehicle door to said door open position;

a door controller;

wherein said door controller is connected to a vehicle dash board and includes a plurality of pushbuttons thereon each in communication with said door controller and adapted to allows said user to manually control said pivotal swinging motion of said vehicle door via pressing of one of said plurality of pushbuttons that are adapted to be in communication with said door controller;

a power source;

wherein said power source is connected to said vehicle power source and provides power to said at least one electric motor and said at least one obstruction sensor switch, and wherein said power source is to be a power source for starting said vehicle and for operating accessories of said vehicle; and wherein said automatic vehicle door opening and closing system increases the safety and convenience of said user by enabling said user to choose between operations selected from a group of operations consisting of closing said vehicle door, and opening said vehicle door without said user having to leave a driver seat of said vehicle.

2. The automatic vehicle door opening and closing system of claim 1 further comprising a hydraulic pump connected to said and operated by said at least one electric motor.

3. The automatic vehicle door opening and closing system of claim 2 wherein said at least one closing arm is formed as a hydraulic cylinder adapted to be in communication with said hydraulic pump such that said at least one closing arm is adapted to be extendable and contractible in length via said hydraulic pump.

4. The automatic vehicle door opening and closing system of claim 1 wherein said at least one closing arm is operated via said at least one electric motor.

5. The automatic vehicle door opening and closing system of claim 4 wherein said at least one closing arm is formed as a toothed rack movable via a pinion gear that is operated via said electric motor and said door controller.

6. The automatic vehicle door opening and closing system of claim 1 wherein said door controller further comprises a manual override operation by pressing one of said plurality of pushbuttons on said door controller.

7. The automatic vehicle door opening and closing system of claim 6 wherein said manual override operation is performed via one of said plurality of pushbuttons.

8. The automatic vehicle door opening and closing system of claim 7 wherein each respective one of said plurality of pushbuttons is adapted to correspond to a different door having a corresponding said automatic vehicle door opening and closing system.

9. The automatic vehicle door opening and closing system of claim 6 wherein said automatic operation includes a duration programmable time delay closure function.

10. The automatic vehicle door opening and closing system of claim 1 further includes an automatic operation having a programmable automatic door open function based on a time clock operation.

11. The automatic vehicle door opening and closing system of claim 1 wherein said at least one closing arm includes a spring member for assisting a door closing function.

12. The automatic vehicle door opening and closing system of claim 1 wherein said at least one obstruction sensor switch is formed as a pressure detecting switch adapted to detect resistance when closing said vehicle door and to reverse motion of said to an open position.

13. The automatic vehicle door opening and closing system of claim 1 wherein said at least one obstruction sensor switch is formed as a motion detector adapted to detect motion within a vehicle door closed plane when said door is closing, and reverse the motion of said door to an open position.

14. The automatic vehicle door opening and closing system of claim 1 further comprising a door handle activation switch adapted to be attached to a door latch and signal said door controller to thereby cause said vehicle door to open via said at least one closing arm when said door latch is released.

15. The automatic vehicle door opening and closing system of claim 1 wherein said at least one electric motor is a direct current powered motor.

16. The automatic vehicle door opening and closing system of claim 1 further comprising a vehicle in motion lockout circuit in communication with a central processing unit of said vehicle and adapted to prevent automatic opening of said vehicle doors while said vehicle is in motion.

17. A combination of a vehicle and an automatic vehicle door opening and closing system comprising:

a vehicle comprising;

a body member having a chassis;

wherein said chassis of said body member includes at least one axle member adapted to support said body member and said chassis and is adapted to couple to at least one wheel;

a steering wheel;

wherein said steering wheel is connected to said chassis and adapted to allow a user to control a direction of travel of said vehicle;

at least one vehicle door;

wherein said at least one vehicle door is hingedly couple to said body member and to enclose said body member against the weather elements;

at least one closing arm comprising;

a door attachment end;

wherein said door attachment end is pivotally attached to a hinge side of a vehicle door; and a vehicle attachment end;

wherein said vehicle attachment end is pivotally attached to a door hinge jamb of a vehicle; and wherein said at least one closing arm is pivotally swing said vehicle door to a user preferred position upon an existing vehicle door hinge axis;

at least one electric motor;

wherein said at least one electric motor is in operative communication with said at least one closing arm and actuates said closing arm to pivotally swing said vehicle door to said user preferred position;

at least one obstruction sensor switch;
  wherein said at least one obstruction sensor switch is connected to a vehicle door jamb to detect an object located within a plane of said vehicle door closed area while said vehicle door is in a door open position and to stop a closing motion of said vehicle door and reverse said closing motion to thereby move said vehicle door to said door open position;
a door controller;
  wherein said door controller is connected to a vehicle dash board and includes a plurality of pushbuttons thereon each in communication with said door controller and allows said user to manually control said pivotal swinging motion of said vehicle door via pressing of one of said plurality of pushbuttons that are in communication with said door controller;
a power source;
  wherein said power source is connected to said vehicle power source and provides power to said at least one electric motor and said at least one obstruction sensor switch, and wherein said power source is a power source for starting said vehicle and for operating accessories of said vehicle; and
wherein said automatic vehicle door opening and closing system increases the safety and convenience of said user by enabling said user to choose between operations selected from a group of operations consisting of closing said vehicle door, and opening said vehicle door without said user having to leave a driver seat of said vehicle.

* * * * *